United States Patent [19]

Kast

[11] Patent Number: 5,591,086
[45] Date of Patent: Jan. 7, 1997

[54] TOY MOTION SIMULATOR AND HYDRAULIC CONTROL VALVE FOR USE THEREIN

[76] Inventor: Howard B. Kast, 7351 Cinnamon Woods Dr., West Chester, Ohio 45069

[21] Appl. No.: 567,923

[22] Filed: Dec. 6, 1995

Related U.S. Application Data

[62] Division of Ser. No. 350,333, Dec. 6, 1994, Pat. No. 5,533,935.

[51] Int. Cl.⁶ .................................................. A63G 31/16
[52] U.S. Cl. ...................................... 472/130; 137/625.2
[58] Field of Search ........................ 137/625.17, 625.2, 137/625.21, 625.22, 625.23, 625.24, 625.25; 91/536; 472/59, 130, 135

[56] References Cited

U.S. PATENT DOCUMENTS

| | | |
|---|---|---|
| 2,448,649 | 9/1948 | Adams et al. ................. 137/625.2 |
| 2,985,147 | 5/1961 | Rockwell . |
| 3,005,533 | 10/1961 | Wadey . |
| 3,017,864 | 1/1962 | Atchley . |
| 3,559,936 | 2/1971 | Guyon . |
| 3,575,209 | 4/1971 | Kast . |
| 3,626,981 | 12/1971 | Bauer-Nilsen ................. 137/625.21 |
| 3,720,007 | 3/1973 | McKechnie et al. . |
| 3,741,237 | 6/1973 | Browne . |
| 3,758,714 | 9/1973 | Herndon . |
| 4,019,261 | 4/1977 | Pancoe . |
| 4,057,078 | 11/1977 | Albrecht et al. ................. 137/625.2 |
| 4,066,256 | 1/1978 | Trumbull . |
| 4,478,407 | 10/1984 | Manabe . |
| 4,505,472 | 3/1985 | Lorenc et al. . |
| 4,522,233 | 6/1985 | Mojadad ..................... 137/625.47 |
| 4,576,577 | 3/1986 | Lam et al. . |
| 4,584,896 | 4/1986 | Letovsky . |
| 4,771,806 | 9/1988 | Widenmann . |
| 5,012,836 | 5/1991 | Jacobsen et al. . |
| 5,015,933 | 5/1991 | Watkins et al. . |
| 5,048,394 | 9/1991 | McLevige et al. . |
| 5,071,352 | 12/1991 | Denne . |
| 5,099,875 | 3/1992 | Smietana . |
| 5,133,379 | 7/1992 | Jacobsen et al. . |
| 5,303,727 | 4/1994 | Wilson et al. . |

*Primary Examiner*—Kien T. Nguyen
*Attorney, Agent, or Firm*—Steven J. Rosen

[57] ABSTRACT

A hydraulic control slide valve and toy motion simulating apparatus for imparting motion to an operator controlled by the hydraulic control slide valve to proportionally direct hydraulic fluid from pitch, roll, and yaw fluid nozzles to respective pitch, roll, and yaw receiving chambers which are pivotably disposed with respect to the nozzles. The valve has a pivotable slider block which in turn has a pitch and roll nozzle to proportionally direct hydraulic fluid to respective nose up and nose down pitch receiving chambers and clockwise and counter-clockwise roll receiving chambers and a yaw nozzle to proportionally direct hydraulic fluid to right and left yaw receiving chambers. The valve has a drain means for directing hydraulic fluid that doesn't flow into the receiving chambers out of the hydraulic control valve.

10 Claims, 10 Drawing Sheets

TOY MOTION SIMULATOR AND HYDRAULIC CONTROL VALVE FOR USE THEREIN

RELATED PATENT APPLICATIONS

The present Application is a divison of U.S. patent application Ser. No. 08/350,333, entitled "TOY MOTION SIMULATOR", filed Dec. 6, 1994 now U.S. Pat. No. 5,533,935.

BACKGROUND OF THE INVENTION

1. Field of the Invention

This invention relates to motion simulators used in toys and rides and, more particularly, to aircraft and other vehicle motion simulating toy devices.

2. Description of Related Art

Motion simulating toys and amusement rides or devices of the prior art simulate some, if not all, of the motions exhibited by helicopters, airplanes, boats, cars, motorcycles, trucks, and other vehicles. Some of the more sophisticated of these motion simulating devices usually have operator controller means in the form of a controller which has a handle such as a wheel or joystick operatively connected to the controller. The controller may be mechanical, electrical, electronic or hydraulic in nature.

Such prior art toys or amusement devices have been found lacking in reliability and safety. The prior art devices have had an unusual number of electromechanical, as well as hydraulic parts, requiring large hydraulic reservoirs and circuits along with numerous hydraulic components leading to a reliability problem and frequent breakdown. Furthermore, because of the complexity and high cost of the prior art devices, they have not been suitable for home use by children. The prior art devices have typically been constructed with complex expensive control valves and actuators in hydraulic circuits requiring large amounts of hydraulic fluid and valving. This has led to reliability problems as well as excessive uses of energy in powering the amusement devices. Another particularly important problem in recent years has been safety of the devices and overrides, not only for the individual in or on the ride, but for those in close proximity and, thus, has not lent itself for sale for the home market particularly because of use around small children.

The present invention overcomes the disadvantages of the prior art by providing a new inexpensive control valve in a hydraulic circuit with a novel type of suspension and actuators that may be powered by ordinary home water pressure from a home water spigot. The present invention provides for a low amount of use of hydraulic energy as well as maximum safety, not only to the individual in the amusement device, but also to those in the surrounding area. Among other advantages of the present invention is that it is easy and inexpensive to construct, maintain and operate.

SUMMARY OF THE INVENTION

The present invention is a motion simulating apparatus for imparting motion to an operator as requested by the operator and provides a hydraulic control valve to proportionally direct hydraulic fluid from pitch, roll, and yaw fluid nozzles to respective pitch, roll, and yaw receiving chambers which are fixed with respect to the pivotable nozzles. One particular embodiment provides a pitch and roll nozzle to proportionally direct hydraulic fluid to respective nose up and nose down pitch receiving chambers and clockwise and counter- clockwise roll receiving chambers and a yaw nozzle to proportionally direct hydraulic fluid to right and left yaw receiving chambers. The valve has a drain means for directing hydraulic fluid that doesn't flow into the receiving chambers out of the hydraulic control valve. The valve is preferably a ball valve having a partially spherical rotatable body with a partially spherical surface disposed within a correspondingly partially spherical shell such that the fluid nozzle means is mounted on the rotatable body and the receiver means is fixedly mounted, with respect to the rotatable body, to the shell. A handle connected to the rotatable body is disposed through a first aperture in the shell.

The motion simulating apparatus has a frame for holding and supporting the operator, a pivotable suspension for pivotably suspending the frame relative to a fixed base and, an actuating means operably connecting the frame to the base for imparting pitch, roll and yaw to the frame means relative to the base. One embodiment of the present invention provides the pivotable suspension with a universal three degree of freedom (3 DOF) bearing, preferably a spherical bearing, having two relatively pivotable members wherein one of the members is fixedly connected to the frame means and another one of the members is fixedly connected to the fixed base. A more particular embodiment of the present invention provides the actuating means with actuators having linearly expandable bellows and water as the hydraulic fluid. The power supply means may be a household water tap connected to the hydraulic control valve which has a return line in fluid communication with the drain means. One alternative power supply is an electrically powered water pump having an outlet connected to a pressurized supply line connected to the hydraulic control valve and a return line connected to the pump's inlet or reservoir such that the pump reuses the same water.

ADVANTAGES

Among the advantages provided by the present invention is an inexpensive control valve and motion simulator that is safe for use by and around children. The present invention provides a hydraulic circuit with a novel type of suspension and actuators that may be powered by ordinary home water pressure from a home water tap such as an outdoor garden hose valve or spigot. The present invention uses low amounts of hydraulic energy. Among other advantages of the present invention is that it is easy and inexpensive to construct, maintain and operate.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
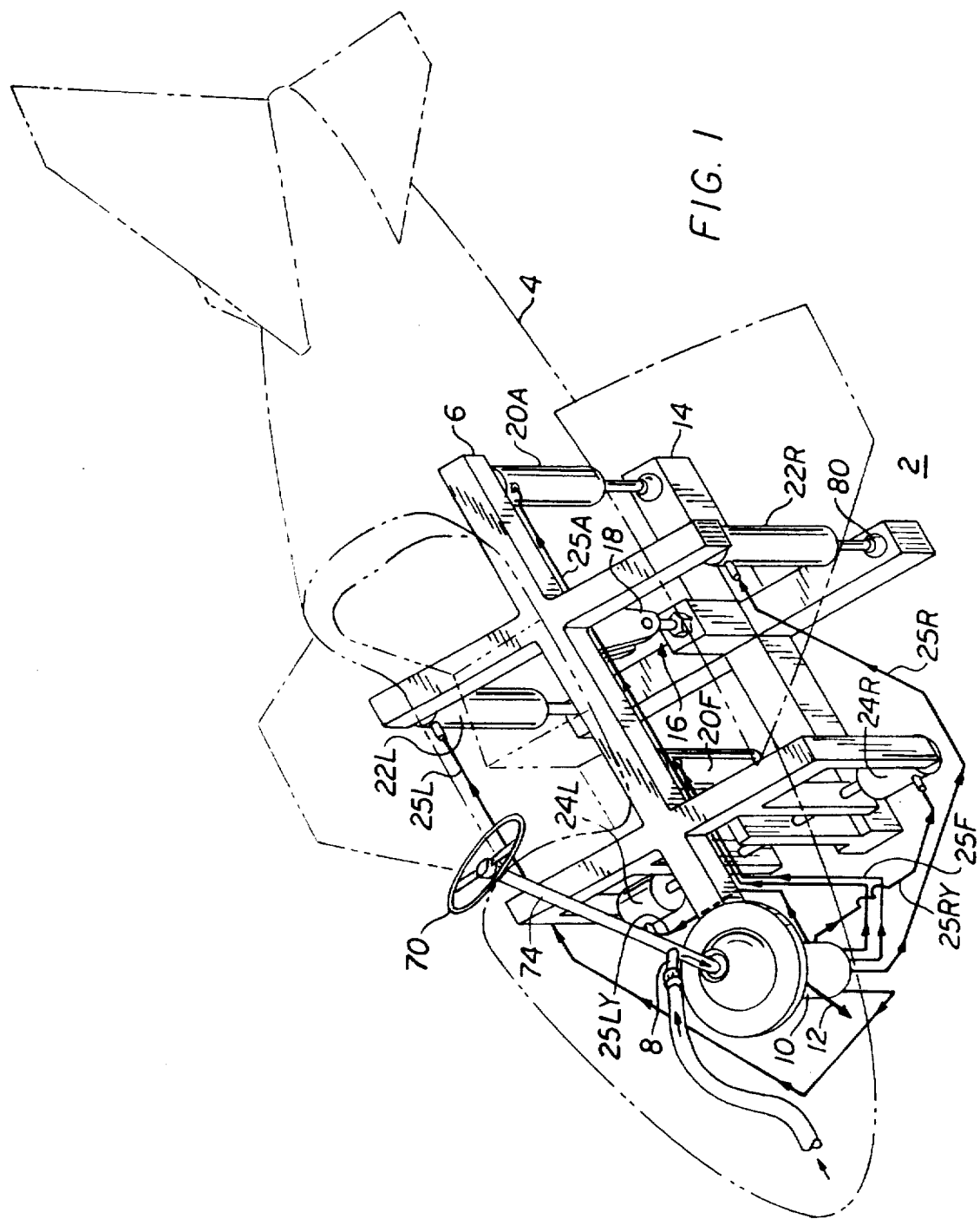
FIG. 1 is a perspective view of a toy aircraft motion simulator in accordance with an exemplary embodiment of the present invention.

Illustrated in FIG. 1 is an exemplary embodiment of a requested motion simulating apparatus 2 for imparting motion to an operator that would be seated in a vehicle body 4 (shown in phantom) attached to a frame 6. The motion simulating apparatus 2 is powered by a hydraulic power system which in the exemplary embodiment of a toy is pressurized house water drawn from a water valve (not shown) and connected by a garden hose to an inlet 8 of a hydraulic control valve 10 having a drain port 12. The terms right, left, clockwise and counter-clockwise are directions and positions as an observer looking aft from a forward position would describe the embodiment presented in all of the FIGS., also referred to as "forward looking aft". The frame 6 is suspended above a base 14 by a pivotable suspension 16 which in the exemplary embodiment includes a spherical bearing 18. An actuating means provides forward and aft pitch actuators 20F and 20A respectively, right and left roll actuators 22R and 22L respectively and, right and left yaw actuators 24R and 24L respectively, which operably connecting the frame 6 to the base 14 for imparting pitch, roll, and yaw to the frame relative to the base. Each of these actuators is hydraulically connected by a single hydraulic line, illustrated as arrowed lines, to a corresponding port in the control valve 10. A more detailed view of the control valve 10 and ports may be seen in FIGS. 2 and 3. The forward and aft pitch actuators 20F and 20A respectively are hydraulically connected to corresponding forward and aft pitch ports 23F and 23A respectively by forward and aft pitch hydraulic lines 25F and 25A respectively. The right and left roll actuators 22R and 22L respectively are hydraulically connected to corresponding right and left roll ports 23R and 23L respectively by right and left roll hydraulic lines 25R and 25L respectively. The right and left yaw actuators 24R and 24L respectively are hydraulically connected to corresponding right and left yaw ports 23RY and 23LY respectively by right and left yaw hydraulic lines 25RY and 25LY respectively.

The hydraulic control valve 10 is constructed to proportionally direct hydraulic fluid from a single combined pitch and roll nozzle 56 and a yaw nozzle 44 to corresponding pitch, roll, and yaw receiving chambers. The pitch and roll nozzle 56 proportionally direct hydraulic fluid to nose up and nose down pitch receiving chambers 50U and 50D respectively and clockwise and counter-clockwise roll receiving chambers 52C and 52CC respectively. The pitch receiving chambers 50U and 50D respectively and the clockwise and counter-clockwise roll receiving chambers 52C and 52CC respectively are preferably constructed from a single cylindrical chamber 57 with an X-shaped divider 59 disposed within to form the nose up and the nose down pitch receiving chambers 50U and 50D respectively and the clockwise and the counter-clockwise roll receiving chambers 52C and 52CC respectively all of which are fluidly isolated from each other across the divider 59. The receiving chambers are disposed in an island 61. The yaw nozzle 44 proportionally directs hydraulic fluid to right and left yaw receiving chambers 54R and 54L respectively which are elevated higher on the island 61 than the other chambers (shown in FIG. 2) so as to reduce gain across a gap 63 between the yaw nozzle and the right and left yaw receiving chambers. Each nozzle is pivotably disposed with respect to its corresponding relatively fixed receiving chambers so that each nozzle can proportionally direct hydraulic fluid to its corresponding relatively fixed receiving chambers.

The control valve 10 has a drain channel 58 which surrounds the island 61 and culminates in the drain port 12. The drain channel 58 directs hydraulic fluid that doesn't flow into the receiving chambers out of the hydraulic control valve. The control valve 10 is a preferably a ball type valve having a partially spherical rotatable body 60 with a partially spherical surface 64 disposed within a correspondingly partially spherical shell 66. The pitch and roll nozzle 56 and yaw fluid nozzle 44 are mounted on the rotatable body 60. The nose up and the nose down pitch receiving chambers 50U and 50D respectively and the clockwise and the counter-clockwise roll receiving chambers 52C and 52CC respectively are fixedly mounted, with respect to the rotatable body 60, to the partially spherical shell 66.

A handle or yoke 70, shown in FIG. 1, is connected to the rotatable body 60 by a hollow shaft 74 that has a central axis 75 and is disposed through a first aperture 76 in the shell 66. The shaft 74 may be turned clockwise or counter-clockwise about the central axis 75 and pivoted forward, aftward, left, and right because it is attached to the semi-spherical rotatable body 60. The pitch and roll nozzle 56 is centered about the central axis 75 and the yaw nozzle 44 is offset from the central axis such that by turning the yoke 70 clockwise or counter-clockwise proportionally directs hydraulic fluid to right and left yaw receiving chambers 54R and 54L respectively, thereby producing left and right yaw of the frame 6 and vehicle body 4. If the pitch and roll nozzle 56 is located slightly to the right of the central axis 75, roll action similar to a real aircraft will occur when yaw is requested. Moving the yoke 70 right and left proportionally directs hydraulic fluid to the clockwise and counter-clockwise roll receiving chambers 52C and 52CC respectively, thereby producing clockwise and counter-clockwise roll of the frame 6 and vehicle body 4. Moving the yoke 70 aft and forward proportionally directs hydraulic fluid to the nose up and nose down pitch receiving chambers 50U and 50D respectively, which causes the frame 6 and vehicle body 4 to pitch up and down.

Figure 4:
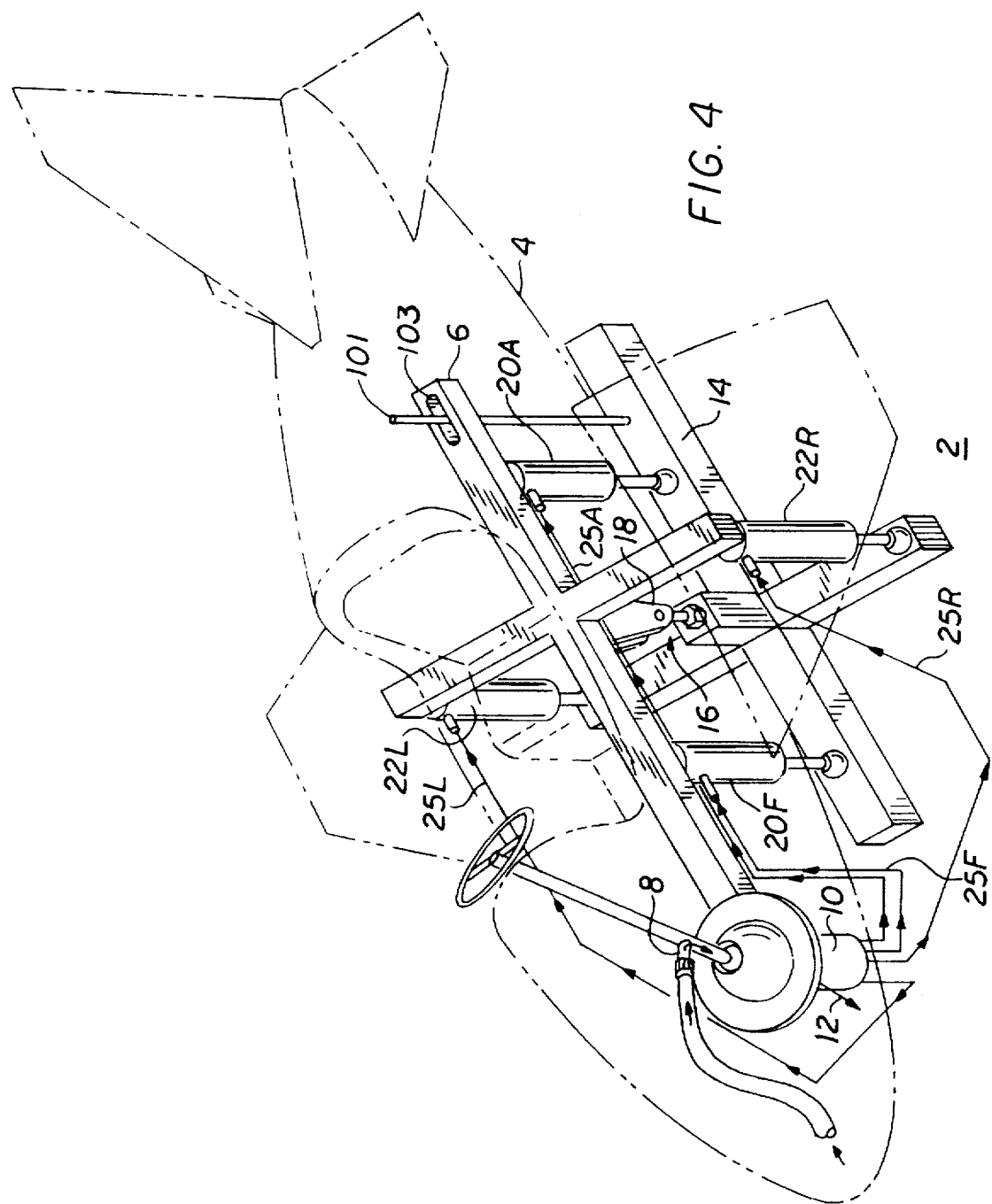
FIG. 4 is a perspective view of a toy aircraft motion simulator in accordance with an alternative embodiment of the present invention.

Illustrated in FIG. 4 is an alternative embodiment of a toy aircraft motion simulator of the present invention having no yaw actuators and none of their associated nozzle, receivers, ports, or lines. Instead, yaw is provided by a combination of roll and pitch action limited by a pole 101 mounted vertically on the base 14 and engaging an elongated aperture 103 in the aft end of the frame 6.

Figure 5:
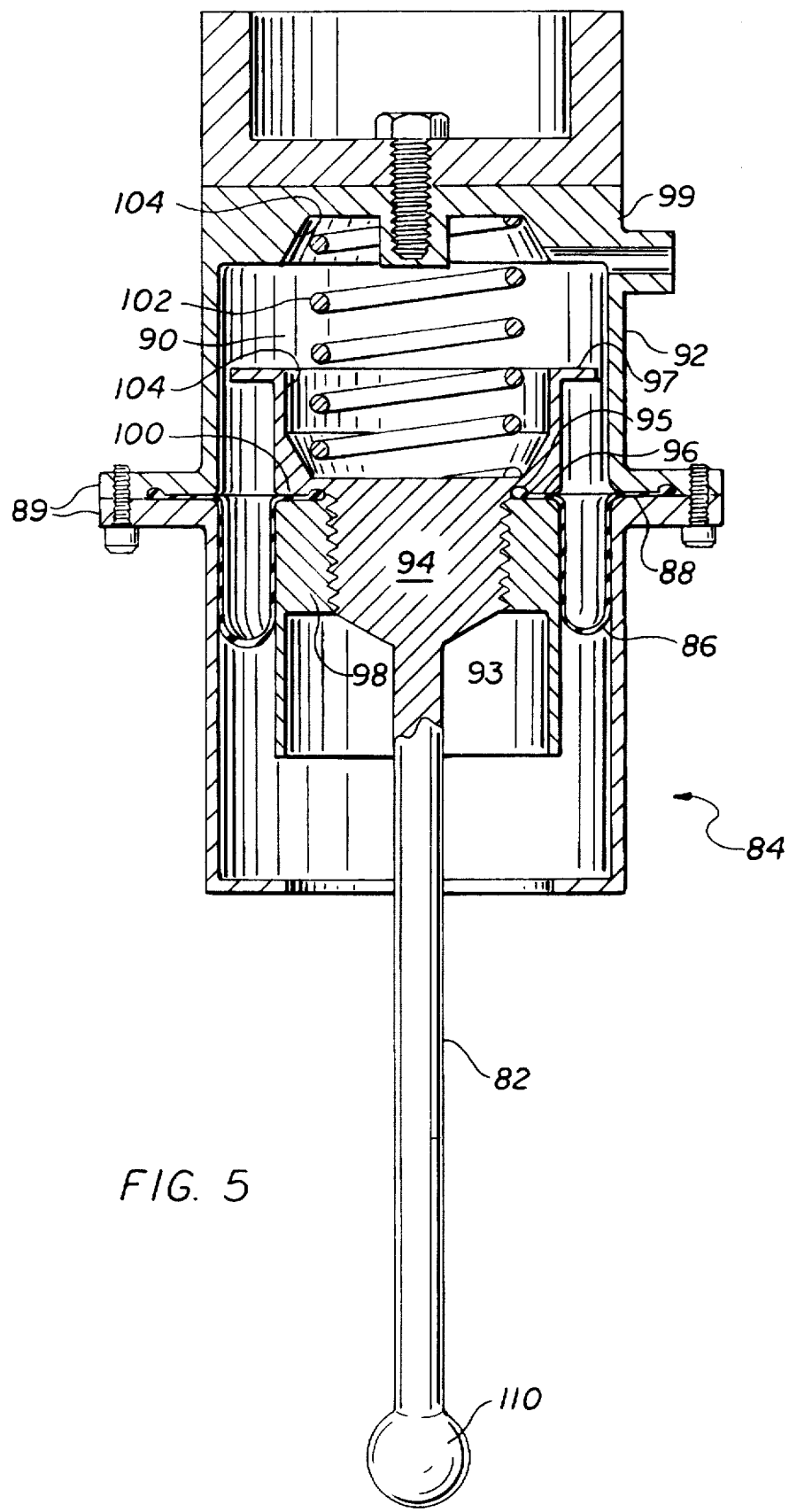
FIG. 5 is a cut-away sectional view of an actuator used in the toy aircraft motion simulator illustrated in FIG. 1 in accordance with one embodiment of the present invention.

Each of the six actuators in FIG. 1 is mounted to the frame 6 and the base 14 using a universal and preferably a ball joint 80 to allow for a combination of pitch, roll, and yaw motion. The actuators are mounted to provide, at least to a limited extent, three degree of freedom at two ends of the rod 82 and/or the actuator. The actuators themselves may be constructed in many different ways. A diaphragm type Belloframe™ actuator 84 is illustrated in FIG. 5 as having an expandable chamber 90 sealed by a rolling diaphragm 86 which is preferably made of cloth reinforced elastomeric material. The diaphragm 86 has an annular outer flange 88 which is sealed between two flanges 89 of a cylindrical actuator housing 92. The rod 82 has a base 93 with a threaded portion 94 which is disposed through a central sealing aperture 95 in an annular inner flange 96 of the diaphragm 86. A lock nut 98 threaded on to the threaded portion 94 seals the annular inner flange 96 of the diaphragm 86 to shoulder 100 of the base 93 of the rod 82. Opposite ends of a compressed spring 102 are disposed in opposing central recesses 104 in an upper end 99 of the housing 92 and in the base 93 of the rod 82. The flexible rolling diaphragm 86 provides, at least to a limited extent, three degrees of freedom of the rod 82 at one end of the rod and a ball 110 of the ball joint 80 provides 3 DOF of the rod at the other end. The spring 102 provides a centering action which tends to position the vehicle body 4 (in FIG. 1) in a neutral position when no hydraulic pressure is applied. A guide flange 97 is disposed around an upper end of the base 93 away from the threaded portion 94 and is spaced slightly apart from the cylindrical actuator housing 92 to restrain lateral movement of the rolling diaphragm 86. The actuator 84 is relatively rigid in directions in horizontal planes yet expands and contracts vertically as the chamber 90 is filled and drained of water.

Figure 6:
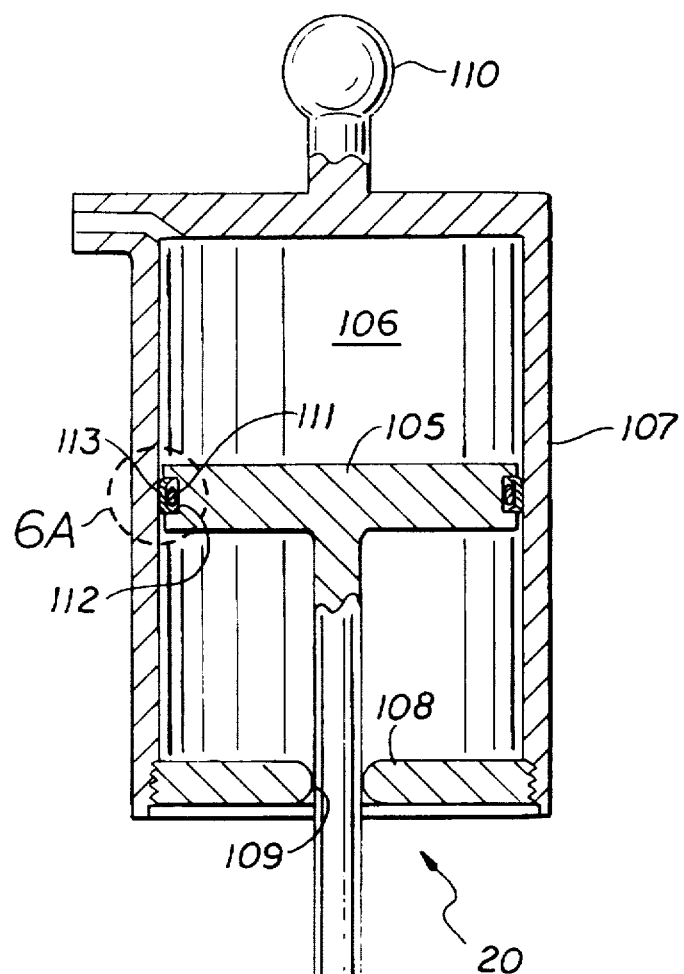
FIG. 6 is a cut-away sectional view of an alternative actuator used in the toy aircraft motion simulator illustrated in FIG. 1 in accordance with one embodiment of the present invention.
Figure 6A:
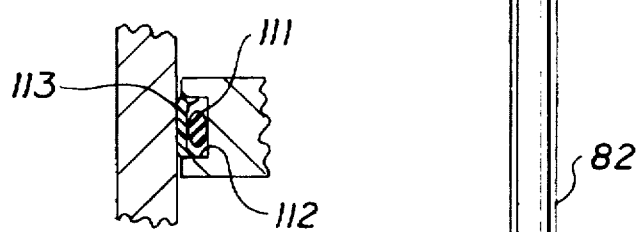
FIG. 6A is an enlarged view illustrating the sealing between the piston and the housing of the actuator in FIG. 6.

Illustrated in FIGS. 6 and 6A is another actuator 20 of the type illustrated in FIG. 1 which is a rod and piston type having a rod 82 that is connected to a piston 105 which is reciprocally disposed in a piston chamber 106 of a cylindrical housing 107 of the actuator 20. At the lower end of the piston chamber 106 is a guide 108 with a centrally located rod guiding aperture 109 through which the rod 82 is disposed. Preferably the housing 107 is pivotably connected to the frame 6 (in FIG. 1) by a ball 110 of the ball joint 80 or some other 3 DOF (three degree of freedom) joining means and the rod 82 is also pivotably connected by a ball joint 80 (or a universal joint may be used) to the base 14 (in FIG. 1). An elastomeric O-ring 111 and its Teflon cap 113 are disposed in a groove 112 around the periphery of the piston 105 to provide continuous sealing between the piston and the housing 107 during the actuators operation and the reciprocating movement of the piston in the housing. The O-ring 111 should be coated with Teflon if the optional Teflon cap 113 is not used. The Teflon provides low friction movement between the parts which is particularly useful for low powered operation. The cylinder housing 107 and the piston are preferably made of plastic.

A conventional double acting actuator with both head and rod end pressure could also be used. This approach would reduce the number of actuators from six to three. Another feasible approach is to use a spring and a single acting actuator for each function. This spring force would be such that at zero pressure the actuator would be at minimum length, at half pressure the actuator would be at half stroke, and at full pressure the actuator would be at maximum length.

Figure 7:
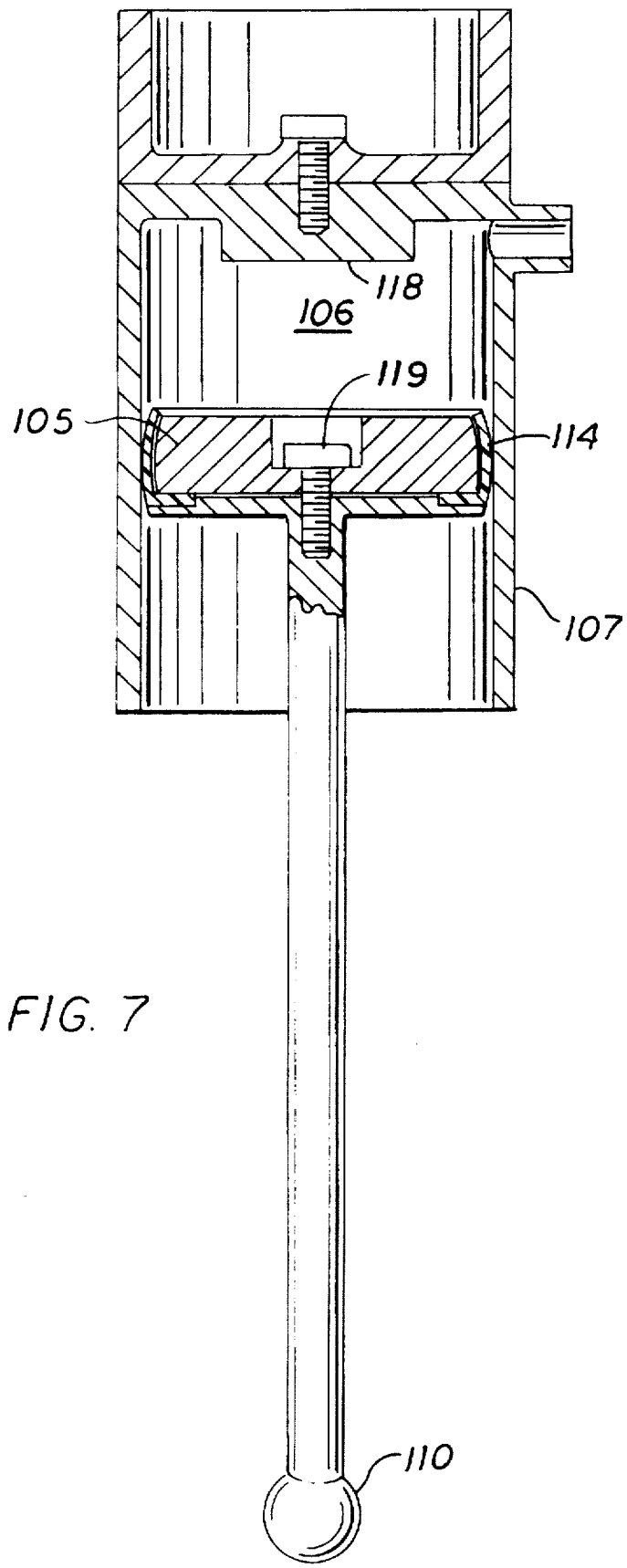
FIG. 7 is a cut-away sectional view of another alternative actuator used in the toy aircraft motion simulator illustrated in FIG. 1 in accordance with one embodiment of the present invention.

Illustrated in FIG. 7 is an alternative actuator 20 having the rod 82, which is connected by a screw 119, to the piston 105 which is tiltably mounted in the cylinder housing 107. The tiltable mounting is provided by a high angle seal 114 disposed around the periphery of the piston 105 which permits the piston and rod 82 to tilt preferably up to about 15 degrees. A means is provided, via actuator stops 118, to limit the tilt to about 10 degrees so as to prevent the seal from unsealing. The tilt can be minimized by shortening the stroke, which is determined by the distance from the vertical axis through the spherical bearing 18, and increasing the actuator length. The high angle seal 114 and the ball joint 80 (in FIG. 1), indicated by the ball 110, provides, at least to a limited extent, three degree of freedom at two ends of the rod 82. The piston 105, rod 82, housing 107, and possibly the high angle seal 114 are preferably made of plastic with Teflon coating between slidable sealing surfaces.

Figure 8A:
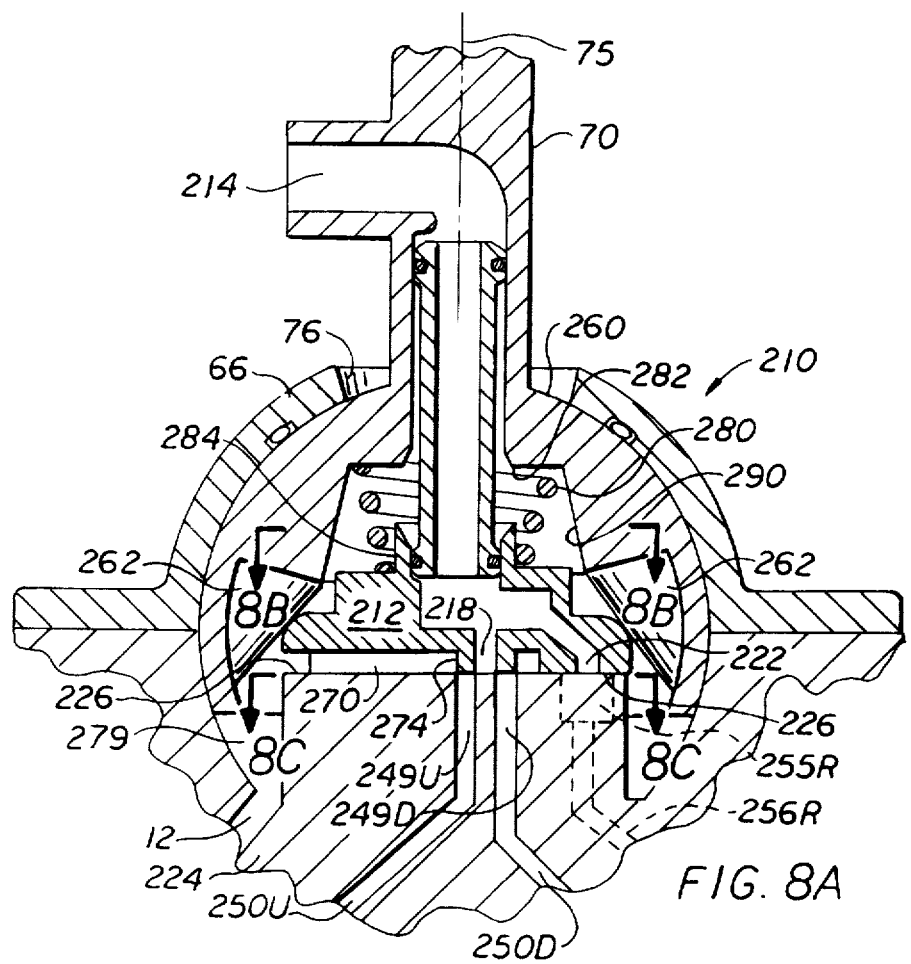
FIG. 8A is a cut-away sectional view of an alternative control valve used to operate the toy aircraft motion simulator illustrated in FIG. 1.
Figure 8B:
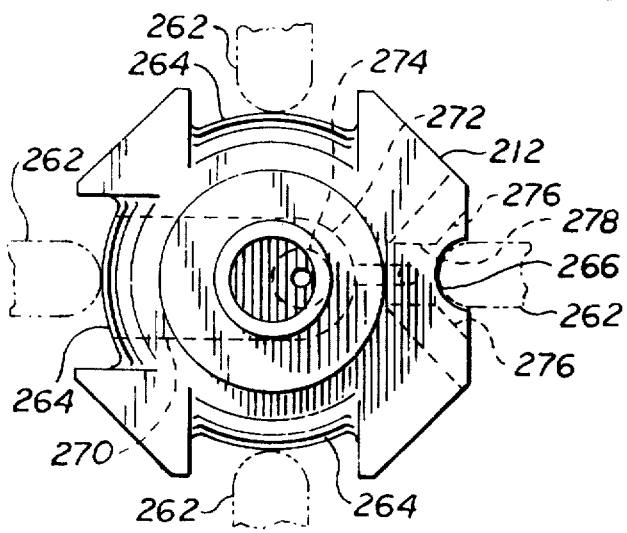
FIG. 8B is a partial cross-sectional view through 8B—8B of the control valve illustrated in FIG. 8A.
Figure 8C:
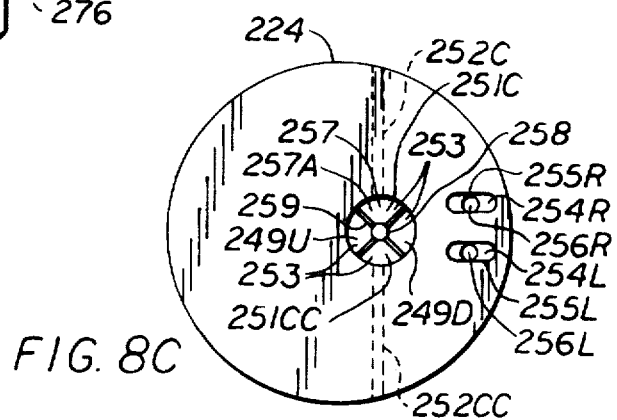
FIG. 8C is a partial cross-sectional view through 8C—8C of the control valve illustrated in FIG. 8A.

An alternative embodiment of the hydraulic control valve 10 in FIG. 1 is a slide valve 210 illustrated in FIGS. 8A, 8B, and 8C. The slide valve 210 has a slider block 212 which is constructed to proportionally direct hydraulic fluid from a single supply line 214 from the inlet 8 of the valve 210 through passages connected to a combined pitch and roll supply port 218 and a yaw supply port 222 to corresponding pitch, roll, and yaw transfer passages and their corresponding receiving ports in a fixed port block 224. Flat interface surfaces 226 of the slider block 212 and the port block 224 are constructed to provide smooth sliding and sealing between the two blocks and various ports. The yoke 70, shown in FIG. 1, is connected to a rotatable guide body 260 by the hollow shaft 74 that has a central axis 75 and is disposed through a first aperture 76 in the shell 66. The rotatable guide body 260 has four identical cylindrical cams 262 which are angled with respect to the flat interface surfaces 226 and which engage three cam follower surfaces 264 and a conformal cam and pivot surface 266. The pivot surface 266 is a semi-circular notch that allows the slider block 212 to pivot about the cams 262 which engages the pivot surface 266 in order to provide pivotable controlled flow of the supply ports that direct water to receiving ports of the transfer passages in the port block 224. The pitch and roll supply port 218 proportionally directs hydraulic fluid to nose up and nose down pitch receiving ports 249U and 249D of nose up and nose down pitch transfer passages 250U and 250D respectively and clockwise and counter-clockwise roll receiving ports 251C and 251CC of clockwise and counter-clockwise roll transfer passages 252C and 252CC respectively. The supply ports are slidably disposed with respect to the relatively fixed receiving ports and their transfer passages. The pitch transfer passages 250U and 250D respectively and clockwise and counter-clockwise roll transfer passages 252C and 252CC respectively have inlet chambers 253 that are preferably constructed from a single cylindrical chamber 257 having a central cylindrical island 258 which forms an annular chamber 257A. The annular camber 257A is equally divided into the four inlet chambers 253 by four equally spaced dividers 259 radially disposed within the annular chamber 257A. All of inlet chambers 253 are fluidly isolated from each other across the dividers 259 and lead to the corresponding forward and aft pitch ports 23F and 23A respectively and the corresponding right and left roll ports 23R and 23L respectively. The center of the island 258 is offset from the axis 75 in its normal centered position so that the vehicle body 4 will roll when yaw is requested in a manner similar to that of a real aircraft.

Figure 2:
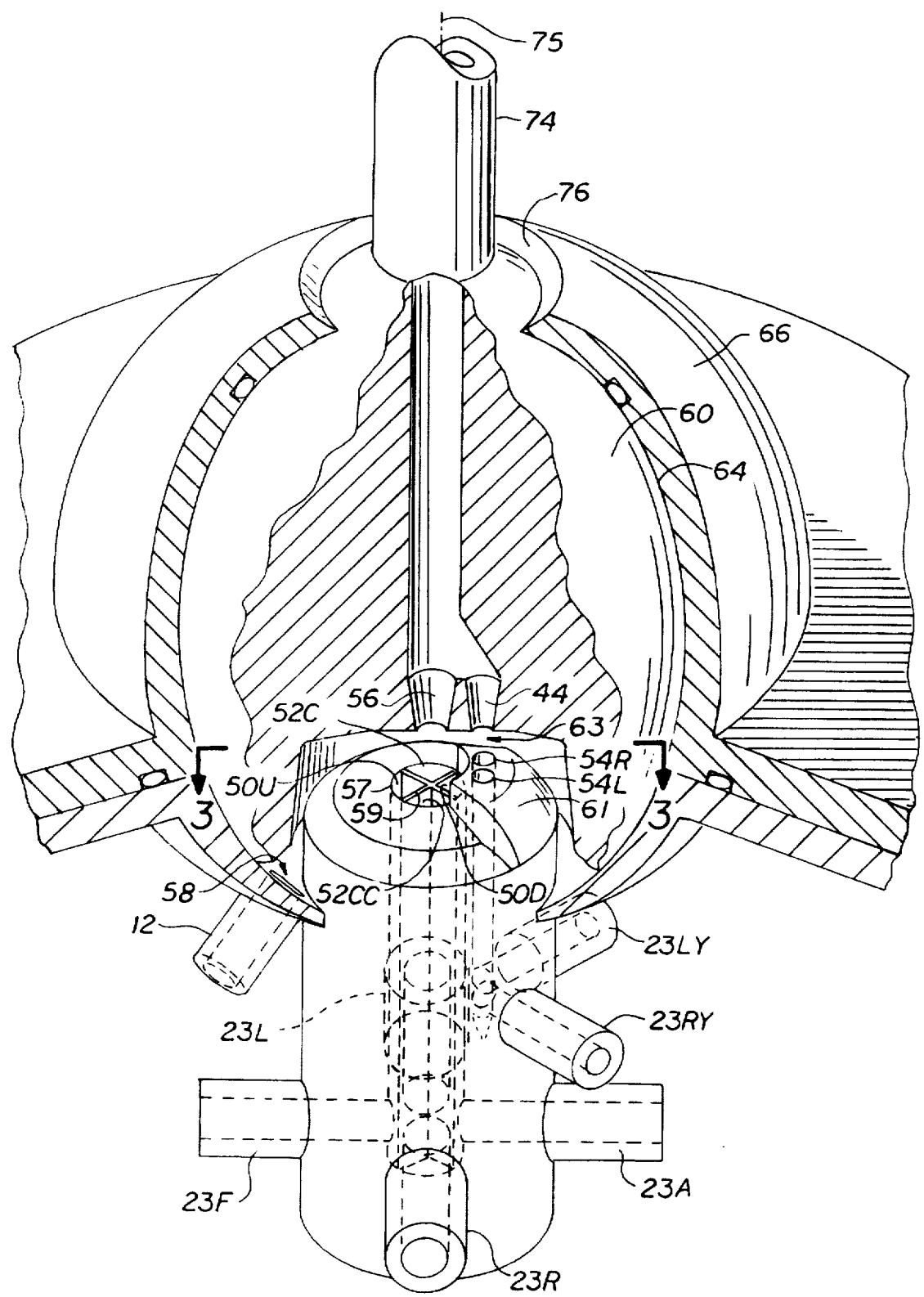
FIG. 2 is a perspective view of a control valve used to operate the toy aircraft motion simulator illustrated in FIG. 1.
Figure 3:
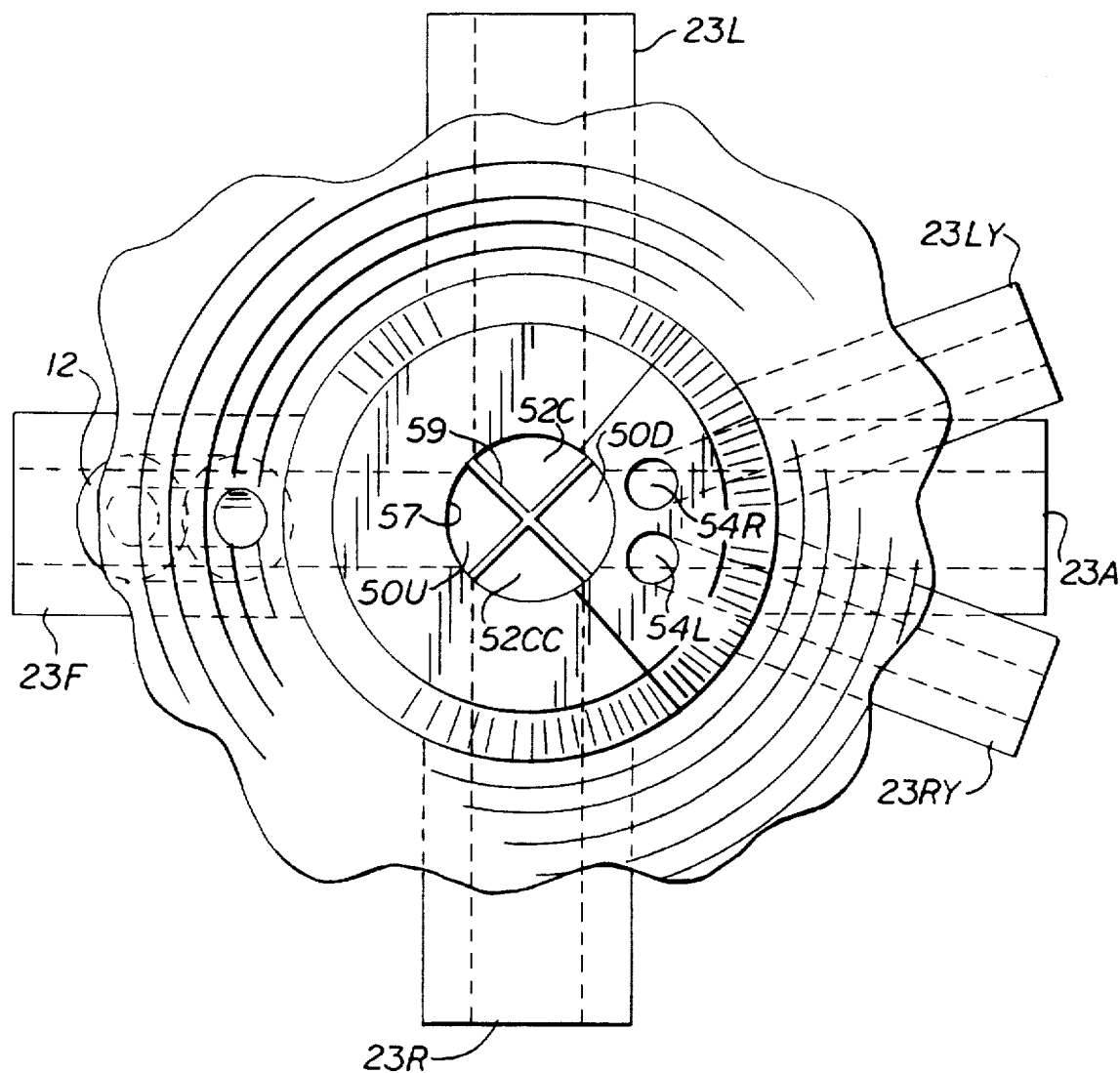
FIG. 3 is a partial cross-sectional view through 3—3 of the control valve illustrated in FIG. 2.

The yaw supply port 222 proportionally directs hydraulic fluid to right and left yaw receiving ports 254R and 254L respectively of corresponding right and left yaw inlet chambers 255R and a 255L respectively located at the beginning of right and left yaw outlet passages 256R and 256L respectively. The right and left yaw outlet passages 256R and 256L terminate at the corresponding right and left roll yaw ports 23RY and 23LY respectively as shown in FIG. 2. The right and left yaw receiving ports 254R and 254L respectively of corresponding right and left yaw inlet chambers 255R and 255L respectively are elongated so that they are able to receive water from the yaw supply port 222 over a range of lateral positions of the slider block 212. Sliding block drain channels are cut into the interface surface 226 of the slider block 212 to allow the water to run back to the drain port 12. The pitch and roll drain channel 270 includes a semi-circular end 272 disposed around an annular port wall 274 of the pitch and roll supply port 218. The two yaw drain channels 276 extend through the slider block 212 up to a rectangular wall 278 through which the yaw supply port 222 is disposed. A drain sump 279 surrounds the port block and leads to the drain port 12.

The slider block 212 is held in slidable sealing engagement with the port block 224 by a coil spring 280 compressed between the top of the slider block and a recessed annular surface 282 of a centrally located annular recess 290 in the rotatable guide body 260. The coil spring 280 has one end centered about a collar 284 that extends up from the slider block 212 and its other end is centered within a the annular recess 290.

Figure 9A:
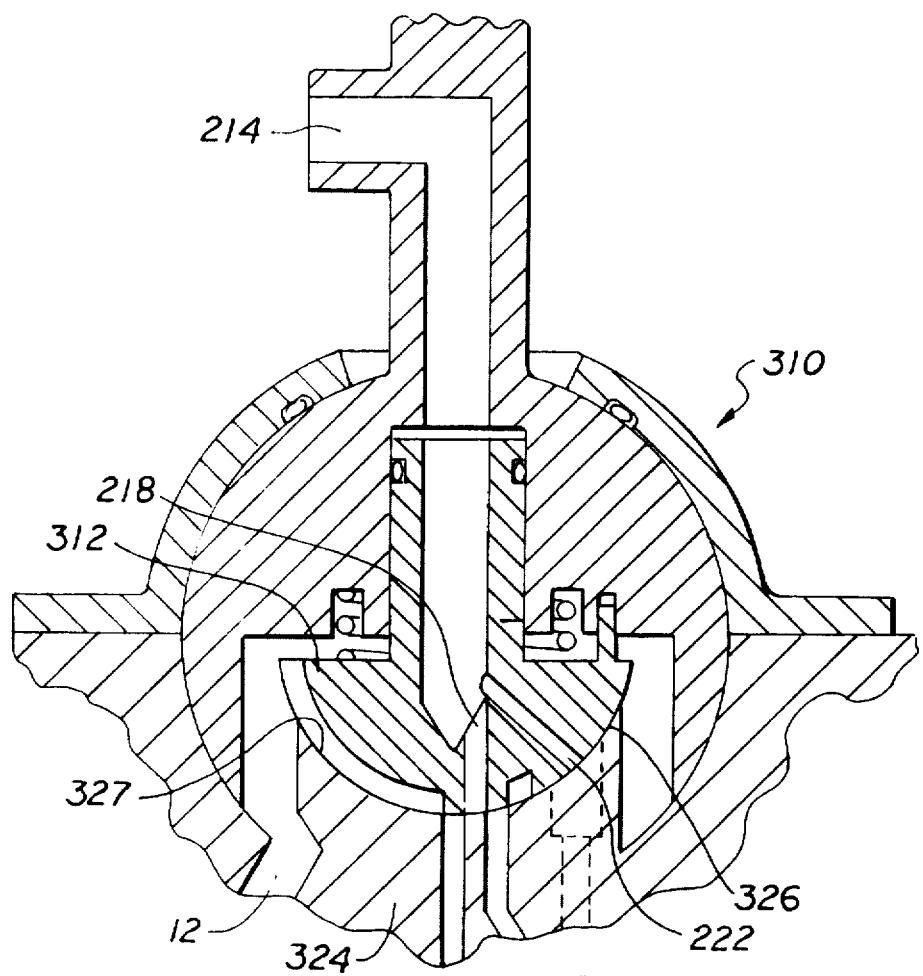
FIG. 9A is a cut-away sectional view of an alternative control valve used to operate the toy aircraft motion simulator illustrated in FIG. 1.
Figure 9B:
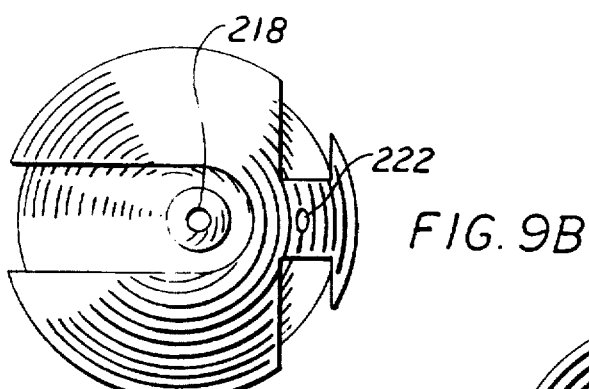
FIG. 9B is an elevational view looking upward of the spherical slider block 312 in FIG. 9A.
Figure 9C:
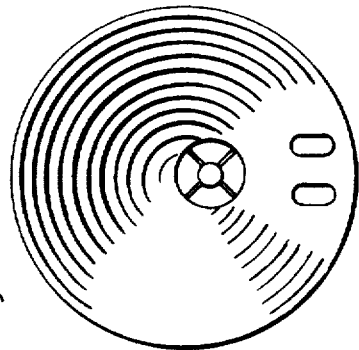
FIG. 9C is an elevational view looking downward of the port block 324 in FIG. 9A.

Yet another alternative embodiment of the hydraulic control valve 10 in FIG. 1 is a spherical slide valve 310 illustrated in FIGS. 9A, 9B and 9C. The spherical slide valve 310 has a spherical slider block 312 which is constructed to proportionally direct hydraulic fluid from a single supply line 214 through passages connected to a combined pitch and roll supply port 218 and a yaw supply port 222 to corresponding pitch, roll, and yaw transfer passages and their corresponding receiving ports in a fixed port block 324. The spherical slider block 312 has a spherically concave contact surface 326 adapted to slidably engage and seal having a spherically convex contact surface 327 of the port block 324 are constructed to provide smooth spherical sliding and sealing between the two blocks and various ports. Alternatively, the concave contact surface may be on the port block and the convex surface may be on the slider block. Sliding block drain channels cut into the interface surface of the spherical slider block 312 allow the water to run back to the drain port 12 via a drain sump which surrounds the port block in a fashion similar to the slider block valve illustrated in FIGS. 8A–8C. Operation is similar to the slider block control valve but no cams are used.

Figure 10:
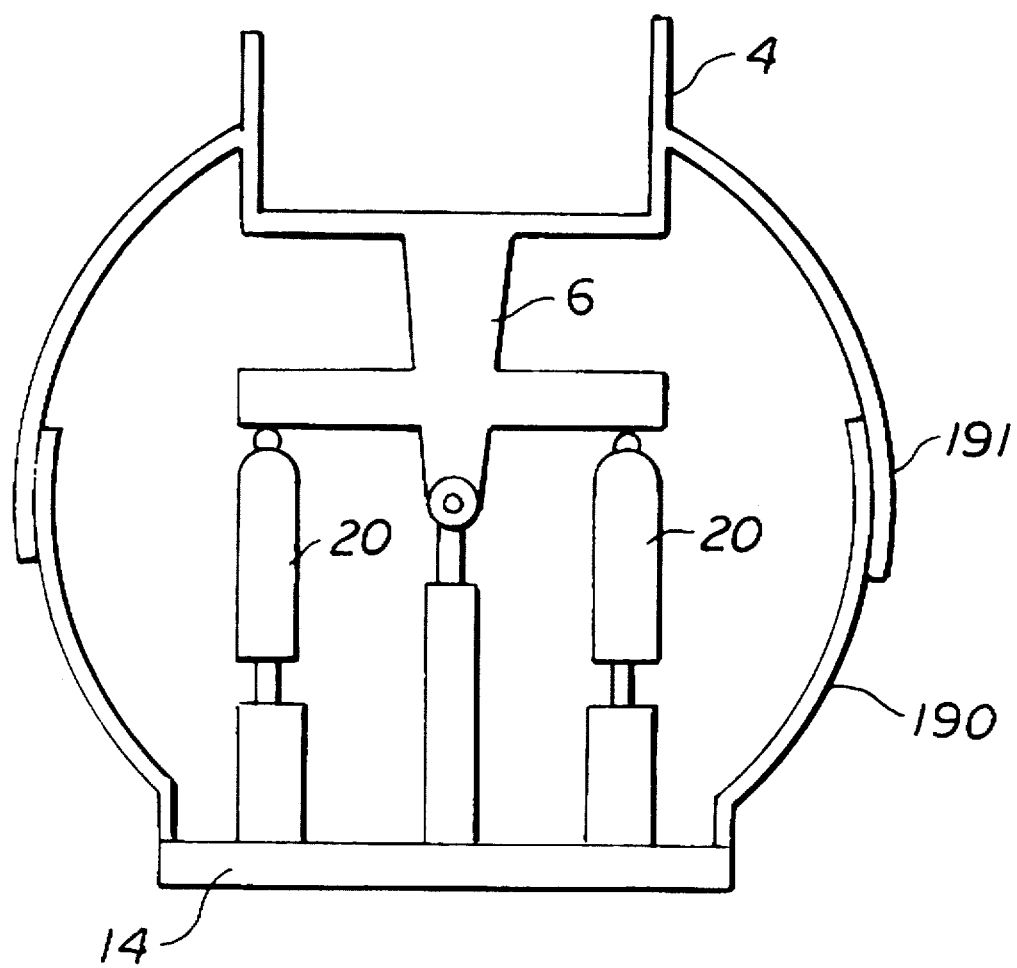
FIG. 10 is a perspective view of the toy aircraft motion simulator illustrated in FIG. 1 with a protective shield in accordance with another embodiment of the present invention.

Illustrated in FIG. 10 is an optional protective shield having inner and outer spherical protective shells 190 and 191 respectively may be mounted to the base 14 and frame 6 or vehicle body 4 to hide the actuators 20 and cover many of the moving parts thereby safely preventing children from catching and pinching their fingers between moving parts.

Although the embodiment of the invention presented above and illustrated in the FIGURES as intended for home use, the invention described herein and claimed has a much broader use such as at amusement parks, child play centers, and shopping areas just to mention a few. While the preferred embodiment of the present invention has been described fully in order to explain its principles, it is understood that various modifications or alterations may be made to the preferred embodiment without departing from the scope of the invention as set forth in the appended claims.

I claim:

1. A hydraulic control valve comprising;

a pivotable slider block having an inlet and first and second supply ports, said first and second supply ports are connected in fluid communication with said inlet by first passage and second passages respectively, said slider block is constructed to proportionally direct hydraulic fluid from said inlet through said first passage and second passages respectively to said first and second supply ports, said first supply port is alignable with not less than two first receiving ports and said second supply port is alignable with not less than two second receiving ports wherein said receiving ports are disposed in a fixed port block, and said blocks have interface surfaces that are in smooth sliding and sealing relationship, a partially spherical rotatable body disposed within a spherical shell and a shaft having a central axis connected to said rotatable body wherein said shaft is disposed though an aperture in said shell, cams mounted on an inside of said rotatable body and angled with respect to said interface surfaces which are flat, and cam follower surfaces disposed on said slider block which engage said cams wherein one of said cam surfaces is a conformal cam and pivot surface in the form of semi-circular notch which engages one of said cams with a generally cylindrical shape.

2. A hydraulic control valve as claimed in claim 1 further comprising;

a drain sump surrounding said port block and leading to a drain port, a first drain channel cut into said flat interface surface of said slider block extends from said drain sump to a semi-circular end disposed around an annular port wall of said first port, two second drain channels cut into said flat interface surface of said slider block extend from said drain sump to said second supply port, and a compressive spring means for holding said slider block in slidable sealing engagement with said port block.

3. A hydraulic control valve as claimed in claim 1 wherein the hydraulic control valve is a spherical slide valve further comprising;

a partially spherical rotatable body including a spherical slider block and disposed within a spherical shell and a shaft having a central axis connected to said rotatable body wherein said shaft is disposed though an aperture in said shell, said spherical slide block having an inlet which is constructed to proportionally direct hydraulic fluid from said inlet through a first passage to a first supply port and through a second passage to a second supply port, said first supply port is alignable with not less than two first receiving ports and said second supply port is alignable with not less than two second receiving ports wherein said receiving ports are disposed in a fixed port block, and said blocks have interface surfaces that are in smooth sliding and sealing relationship, and one of said interface surfaces is a spherically concave contact surface adapted to slidably engage and seal the other of said interface surfaces which is a spherically convex contact surface.

4. A hydraulic control valve as claimed in claim 3 further comprising;

a drain sump surrounding said port block and leading to a drain port, a first drain channel cut into said spherically concave contact surface of said slider block extends from said drain sump to a semi-circular end disposed around an annular port wall of said first port, and two second drain channels cut into said spherically concave contact surface of said slider block extend from said drain sump to said second supply port.

5. A motion simulating apparatus for imparting motion to an operator, said apparatus comprising:

a frame means for holding and supporting the operator, a pivotable suspension means for pivotably suspending said frame means relative to a fixed base, an actuating means operably connecting said frame means to said base for imparting pitch, roll and yaw to said frame means relative to said base, an actuating means for operably connecting said frame means to said base and imparting pitch, roll, and yaw to said frame means relative to said base, said actuating means having separate hydraulic pitch and roll actuators, a hydraulic control slide valve to proportionally direct hydraulic fluid to separate nose up and nose down hydraulic pitch actuators and clockwise and counter-clockwise roll actuators in said actuating means, said hydraulic control slide valve comprising;

a pivotable slider block having an inlet and first and second supply ports, said first and second supply ports are connected in fluid communication with said inlet by first passage and second passages respectively, said slider block is constructed to proportionally direct hydraulic fluid from said inlet through said first passage and second passages respectively to said first and second supply ports, said first supply port is alignable with nose up and nose down pitch receiving ports and clockwise and counter-clockwise roll receiving ports, said second supply port is alignable with right and left yaw receiving ports, said receiving ports are disposed in a fixed port block, and said blocks have interface surfaces that are in smooth sliding and sealing relationship.

6. A motion simulating apparatus as claimed in claim 5 further comprising;

a partially spherical rotatable body disposed within a spherical shell and a shaft having a central axis connected to said rotatable body wherein said shaft is disposed though an aperture in said shell, said slider block operably linked to said rotatable body, said right and left yaw receiving ports spaced apart a distance from said central axis, and said clockwise and counter-clockwise roll receiving ports offset from said central axis between said central axis and said right and left yaw receiving ports.

7. A motion simulating apparatus as claimed in claim 6 further comprising;

a partially spherical rotatable body disposed within a spherical shell and a shaft having a central axis connected to said rotatable body wherein said shaft is disposed though an aperture in said shell, cams mounted on an inside of said rotatable body and angled with respect to said interface surfaces which are flat, and cam follower surfaces disposed on said slider block which engage said cams wherein one of said cam surfaces is a conformal cam and pivot surface in the form of semi-circular notch which engages one of said cams with a generally cylindrical shape.

8. A motion simulating apparatus as claimed in claim 7 further comprising;

a drain sump surrounding said port block and leading to a drain port, a first drain channel cut into said flat interface surface of said slider block extends from said drain sump to a semi-circular end disposed around an annular port wall of said first port, two second drain channels cut into said flat interface surface of said slider block extend from said drain sump to said second supply port, and a compressive spring means for holding said slider block in slidable sealing engagement with said port block.

9. A motion simulating apparatus as claimed in claim 6 wherein said valve is a spherical slide valve wherein;

said slider block is a spherical slider block, said blocks have interface surfaces that are in smooth sliding and sealing relationship, and one of said interface surfaces is a spherically concave contact surface adapted to slidably engage and seal the other of said interface surfaces which is a spherically convex contact surface.

10. A motion simulating apparatus as claimed in claim 9 further comprising;

a drain sump surrounding said port block and leading to a drain port, a first drain channel cut into said spherically concave contact surface of said slider block extends from said drain sump to a semi-circular end disposed around an annular port wall of said first port, and two second drain channels cut into said spherically concave contact surface of said slider block extend from said drain sump to said second supply port.

* * * * *